United States Patent [19]

Emerson et al.

[11] 4,348,894

[45] Sep. 14, 1982

[54] FUEL QUANTITY MEASURING APPARATUS

[75] Inventors: Reginald S. Emerson; John E. Lovelock, both of Buckingham, England

[73] Assignee: Leslie Hartridge Limited, Buckingham, England

[21] Appl. No.: 162,662

[22] Filed: Jun. 24, 1980

[30] Foreign Application Priority Data

Jun. 29, 1979 [GB] United Kingdom ............... 7922649

[51] Int. Cl.³ .......................................... G01M 15/00
[52] U.S. Cl. ..................................... 73/119 A; 73/239
[58] Field of Search ................. 73/119 A, 168, 3, 149, 73/427, 239

[56] References Cited

U.S. PATENT DOCUMENTS

| 2,924,096 | 2/1960 | Humphres | 73/149 |
| 4,070,910 | 1/1978 | Alban | 73/239 |
| 4,088,012 | 5/1978 | Emerson | 73/119 A |
| 4,119,120 | 10/1978 | Mehaffy et al. | 251/61.1 X |

*Primary Examiner*—Jerry W. Myracle
*Attorney, Agent, or Firm*—Berman, Aisenberg & Platt

[57] ABSTRACT

Measuring apparatus for measuring the quantity of calibration fluid delivered by engine-fuel injection apparatus, in which calibration fluid is passed into a hollow cylinder on one side of a piston to displace the latter in one direction along the cylinder and pressurized gas is passed into the cylinder on the other side of the piston to displace it in the other direction and so drain calibration fluid from the cylinder.

11 Claims, 6 Drawing Figures

FUEL QUANTITY MEASURING APPARATUS

This invention relates to measuring apparatus for measuring the quantity of calibration fluid (a liquid) delivered by engine fuel-injection means when being tested on a test bench or other testing machine embodying or connected to the said measuring apparatus. It is especially applicable to measuring systems for use with fuel injection means of the kind in which several pumps are included in one unit and which require the delivery from each pump to be measured simultaneously, such systems being widely used in Diesel engines. The invention is not however restricted to this particular use, and other fuel-injection means may also be used with the measuring apparatus of the present invention.

Extensive use has been made over many years of fuel injection measuring apparatus having graduates in the form of vertically-arranged transparent tubes which receive and measure the quantity of calibration fluid delivered by fuel injection equipment. A disadvantage however of this form of measuring apparatus is that the meniscus formed by the calibration fluid in the tubes makes it difficult to take an accurate reading. This may be aggravated by aeration of the calibration fluid and vibration. Furthermore, time must be allowed for the calibration fluid to settle after being received in the graduate and before being measured. More time must be allowed to drain all or substantially all calibration fluid from the graduate before taking a further reading. This is inaccurate, slow and inefficient.

Another form of measuring apparatus makes use of a cylindrical chamber having a piston or plunger which is displaced by calibration fluid which enters the chamber from the fuel injection equipment being tested, the displacement of the piston or plunger being a measurement of the amount of calibration fluid delivered by the said equipment. Normally the plunger or piston has a piston rod which is arranged to actuate the stem or other such part of a linear transducer.

In another construction which is, in effect, a cross between these two forms of measuring apparatus, pistons or plungers within the graduates are displaced in an upward direction by calibration fluid issuing from the injection equipment under test, and in a downward direction by calibration fluid delivered by the test bench. This construction retains the simplicity of the open graduate type while overcoming its disadvantages. However, the presence of calibration fluid on both sides of the piston or plunger results in a relatively long draining procedure. It also makes relatively complex inlet and outlet manifolds desirable to ensure that any air which finds its way under the piston is effectively purged.

Accordingly, in the present invention, the piston or plunger is displaced in one direction by calibration fluid from the equipment being tested, and in the opposite direction by pressurized air or other gas.

Preferably, the calibration fluid moves the piston downwardly, and the pressurized air or gas moves it upwardly. Any calibration fluid which seeps through the seal between the piston or plunger and the graduate will then flow downwardly under the action of gravity away from piston, and can be drained conveniently from the bottom of the graduate.

One possible form of valve construction for use in routing calibration fluid into and away from the graduates, but which is not restricted to such use, comprises first and second blocks formed with appropriate bores and between which is sandwiched a flexible diaphragm. Calibration fluid is allowed to flow along selected routes on one side of the diaphragm, the selection being made by means of plungers on the other side of the diaphragm. The plungers may be operated by compressed air, for example through the intermediary of a second diaphragm interposed between the second block and a third block. The compressed air acts on the second diaphragm via passageways in the third block, and the second diaphragm in turn pushes the selected plungers against the first diaphragm.

An example of measuring apparatus in accordance with the invention is shown in the accompanying diagrammatic drawings, in which.

Figure 1:
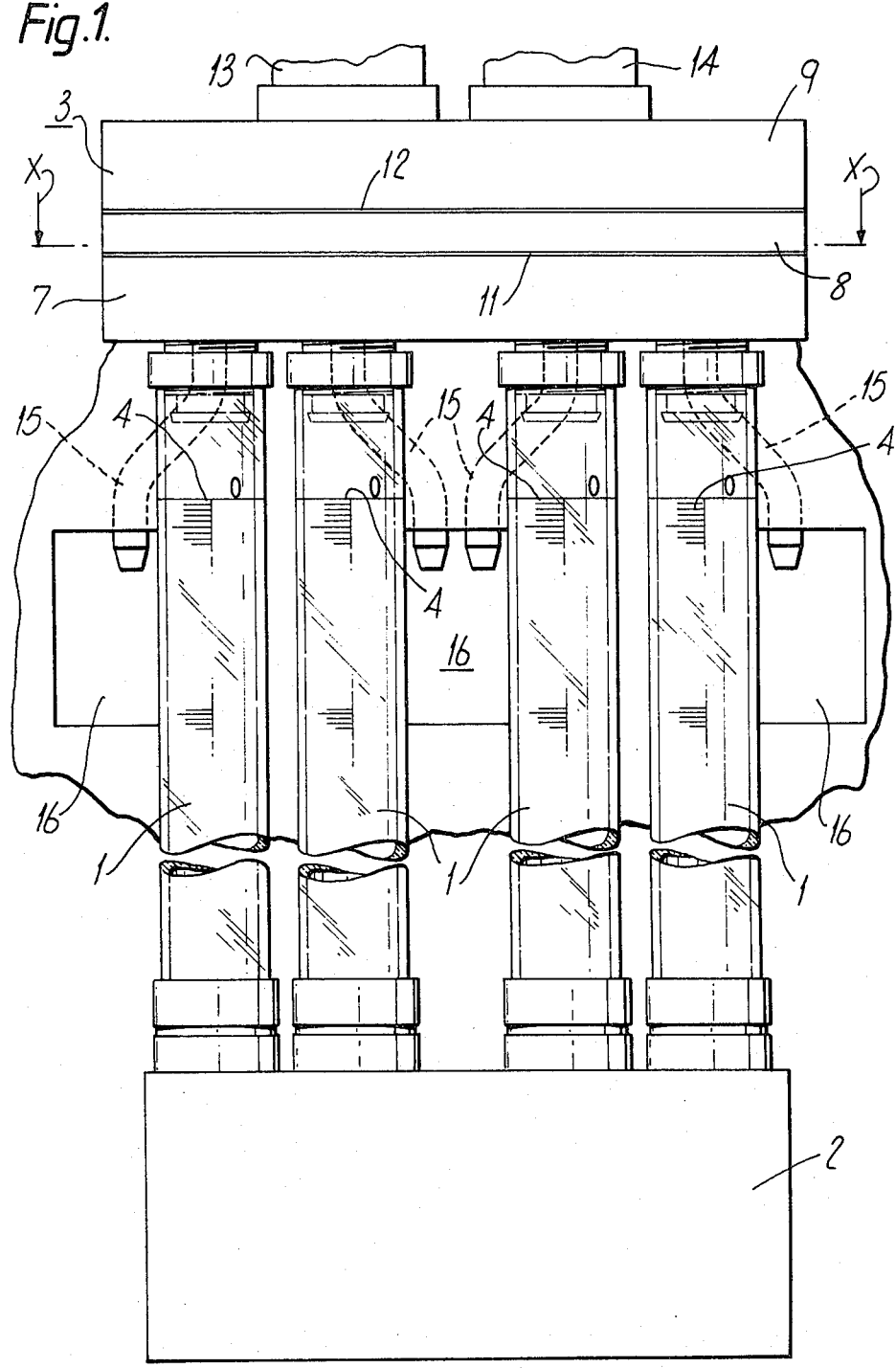
FIG. 1 shows a front elevational view of the apparatus.
Figure 2:
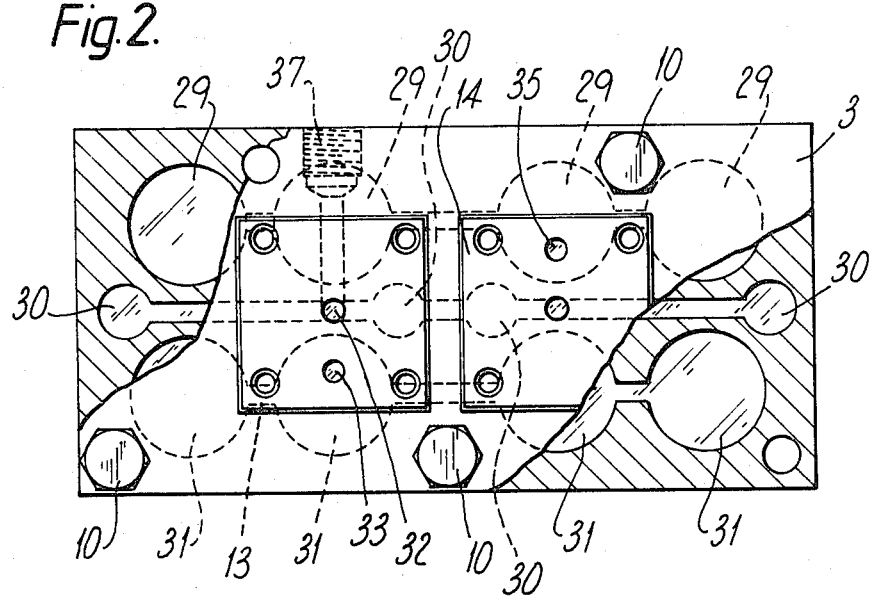
FIG. 2 shows diagrammatically a plan view of the apparatus.
Figure 3:
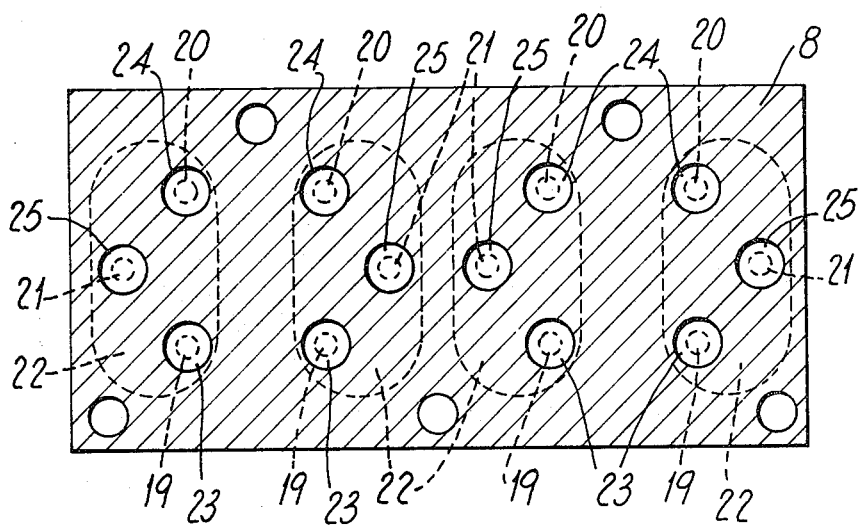
FIG. 3 shows a sectional view on the line "X—X" in FIG. 1.
Figure 4:
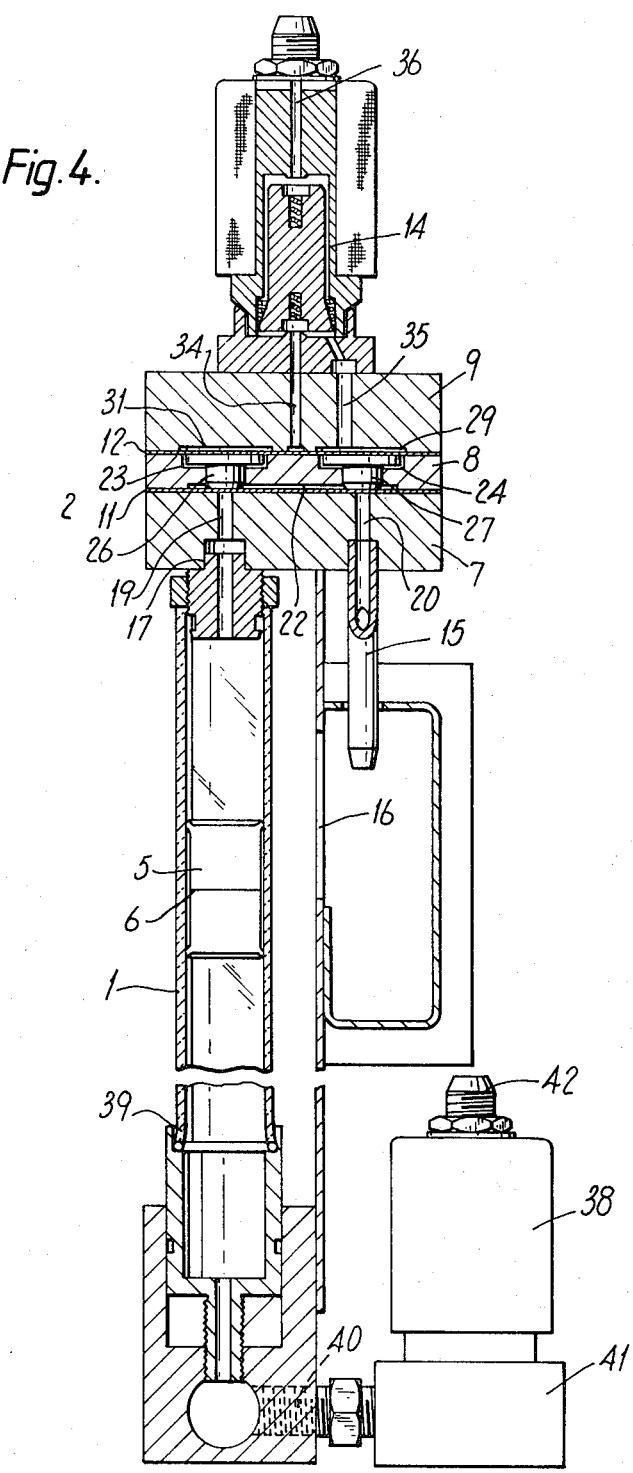
FIG. 4 shows an axial sectional side view of the apparatus.
Figure 5:
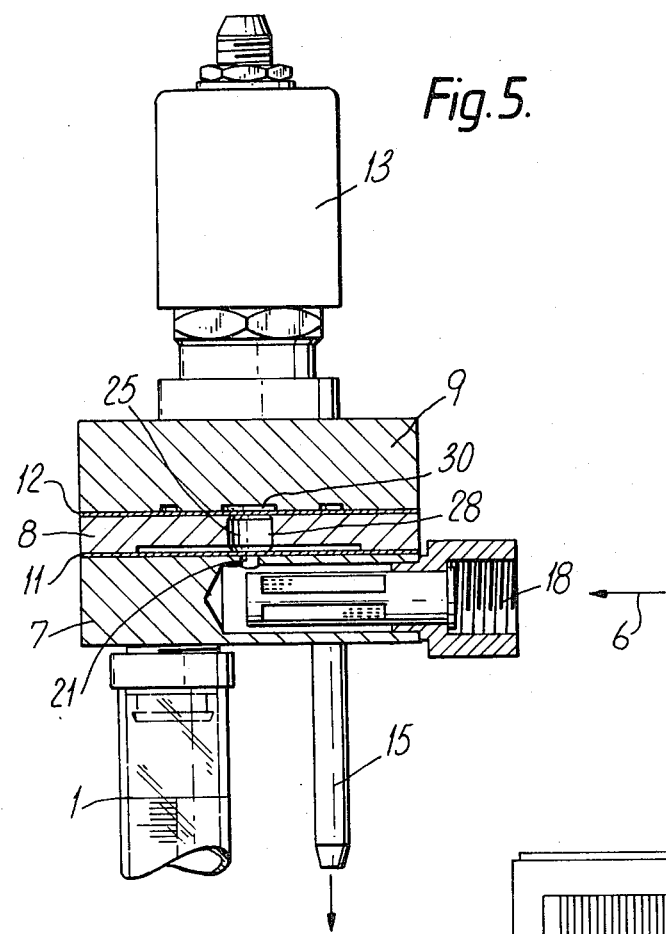
FIG. 5 shows a further axial sectional side view in a different sectional plane.
Figure 6:
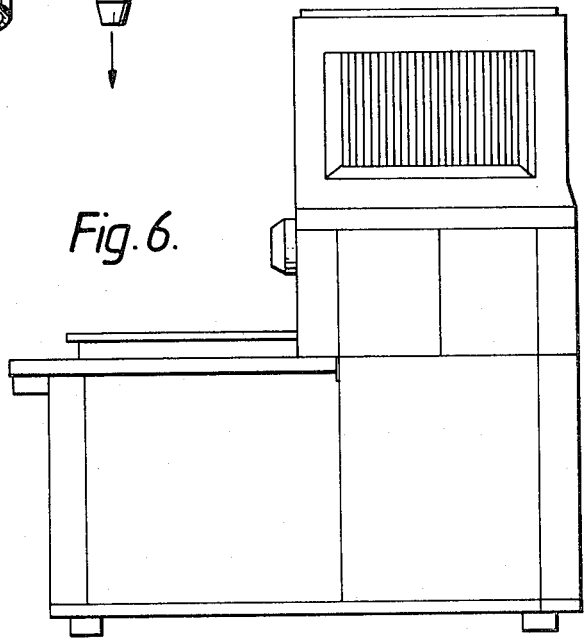
FIG. 6 shows a front elevational view of a test stand used for supporting the apparatus.

With reference to FIG. 1, four transparent graduates 1 are supported vertically between a base 2 and a valve construction 3. Each graduate is marked with a scale 4 having its zero at the top of the graduate and increasing in value downwardly. The valve construction 3 is arranged to control entry of calibration fluid from four fuel injectors of a Diesel engine under test into the four graduates respectively. As calibration fluid enters one of the graduates 1, it pushes down a piston 5 (shown in FIG. 4), and the position of a mark 6 on the piston 5 in relation to the scale indicates how much calibration fluid has entered the graduate. It will be appreciated that any fuel injection apparatus other than that of a Diesel engine could be tested, and the measuring apparatus could be modified for testing any number of injectors, other than four, simultaneously.

The valve construction 3 comprises three blocks 7,8 and 9 stacked and bolted together by bolts 10, with a flexible sheet diaphragm 11 between blocks 7 and 8, and another 12 between blocks 8 and 9. Solenoid operated valves 13 and 14 control calibration fluid flow through the blocks, and calibration fluid return outlet tubes 15 extend downwardly from the lowest block 7 for drainage of the calibration fluid. Apertures 16 reveal the lower ends of the tubes 15.

The detailed structure of the valve construction 3 is made clear by FIGS. 2 to 5. The lowest of the three blocks 7 has a connection bore 17 for each graduated tube. Outlet tubes 15 and calibration fluid inlet connection 18 are connected to the block 7. Respective holes 19, 20 and 21 in the block 7 lead from each connection bore 17, outlet tube 15 and inlet connection 18, and terminate at the upper face of this block 7. For each graduate, the centre block 8 has a cavity 22 on its lower face shaped so as to cover the three holes 19, 20 and 21. A piece of the diaphragm 11 is trapped between those three holes and the cavity so that calibration fluid entering the inlet connection 18 can deflect the diaphragm into the cavity and run towards the hole 19 and the connection bore 17 for the graduated tube and also the hole 20 and the outlet tube 15. The centre block 8 also contains holes 23, 24 and 25 in register with the three holes in the lower block 7 in respect of each graduate, and each of these holes contains a freely sliding plunger 26, 27 or 28 of length equal to the thickness of the centre block 8. If a downward force is applied to the plunger 28 covering the inlet connection 18, a back pressure on the incoming calibration fluid will be applied. Similarly, if a downward force is applied to the plunger 26 covering the hole 19 to the bore 17 and the graduate, incoming calibration fluid will be prevented from entering the graduate 1 and will pass out through the outlet tube 15 via the hole 20. Conversely, if a downward force is applied to the plunger 27 covering the hole 20 leading to the outlet tube 15, calibration fluid will be prevented from passing through the outlet tube and it must, therefore, flow into the graduate via hole 19 and connection bore 17.

Alternately-applied forces on the two plungers 26 and 27 can, therefore, cause incoming calibration fluid to pass either to the outlet tube 15 or to the graduate 1, while a steady force on the plunger 28 over the inlet can cause a continuous resistance to incoming calibration fluid for the purpose of ensuring that air dissolved in the calibration fluid remains in solution after passing through the test injector.

The uppermost of the three blocks 9 has three cavities 29, 30 and 31 machined in its lower surface, one cavity 31 covering all the plungers 26 associated with the graduates, a second cavity 29 covering all the plungers associated with the outlet tubes 15 and the third cavity 30 covering all the plungers associated with the inlet connections 18. The second diaphragm 12 is interposed between the holes 23, 24 and 25 containing the plungers, and the cavities 29, 30 and 31.

First and second three-port two-way solenoid valves 13 and 14 are fitted to the top face of the upper block 9. Two of the ports 32 and 33 of the first valve 13 are connected, one with the cavity 31 and one with the cavity 30. The second solenoid valve 14 has two of its ports 34 and 35 connected one with the cavity 30 and one with the cavity 29. The third ports 36 of both these valves is at the opposite ends of the valves, at their tops, and has direct access to the atmosphere.

The operation of the valve construction 3 is as follows:

Air at an elevated pressure (e.g. 3 bar) is applied through inlet 37 to the cavity 30. This air forces the upper diaphragm 12 downwards against the plungers 25 which in turn apply forces against the upper surface of the lower diaphragm 11 to create a back pressure against the incoming calibration fluid of approximately 3 bar. When the first solenoid valve 13 is energised connection is made between the cavities 30 and 31, thus causing the pressurised air to force the diaphragm 12 downwardly onto the plungers 26 associated with the graduates 1 thus preventing incoming calibration fluid from passing to the graduates. Thus the calibration fluid escapes down the outlet tubes 15.

When the first solenoid valve 13 is de-energised, the air pressure in the cavity 31 is released through the third port of the valve and the associated plungers 26, over the graduates 1, are free to lift.

When the second solenoid valve 14 is energised, air is fed to the cavity 29 which in like manner prevents calibration fluid from escaping through the outlet tubes 15. As a result the calibration fluid is forced to flow into the graduates 1 through holes 19 and connection bores 17. When the second solenoid valve 14 is de-energized the air in the cavity 29 escapes through the third port 36 of the second solenoid valve 14 permitting calibration fluid once more to escape through the outlet tubes 15.

A counting mechanism associated with a test bench drive shaft (not shown) causes the second solenoid valve 14 to be energized over a prescribed number of test bench turns thus causing incoming calibration fluid to pass into the graduates 1 during this prescribed number of turns. When the count is completed the count mechanism causes the first solenoid valve 13 to be energised instead of the second solenoid valve 14 so as to prevent calibration fluid from entering the graduates 1 and causing it to escape through the outlet tubes 15.

When calibration fluid enters a graduate 1 the piston 5 which forms a seal on the inner surface of the graduate 1 is displaced downwardly. Thus, when the solenoid valves each change their state, the piston 5 will come to rest in the graduate 1 to indicate the volume of calibration fluid delivered during the prescribed number of test bench turns to that particular graduate.

The plungers 26 and 27 associated with the graduates 1 and with the outlet tubes 15 are stepped so that each upper surface has a larger area than the lower surface. This magnifies the pressure exerted on the upper surface of the lower diaphragm 11 so as to ensure satisfactory sealing between the lower face of the lower diaphragm 11 and the upper face of the lowest block 7.

The bottom ends of all the graduates are connected with a common duct 40 in a common manifold provided with a third three-port two-way solenoid valve 38. When the third solenoid valve 38 is energized air at approximately 3 bar is admitted to the manifold via an inlet 41 of the valve 38 and thus to the lower surface of each piston 5. At the same time the first solenoid valve 13 is de-energized thus permitting the calibration fluid above the pistons to be ejected through the outlet tubes 15 so that the pistons return to zero setting at the tops of the graduates. Any air that might have come into a graduate will remain at the top end of the graduate and will be ejected first thus automatically purging the system. Any calibration fluid which seeps past a piston will be ejected with the exhausting air from the common manifold, through an exhaust outlet 42 of the valve 38, when the third solenoid valve 38 is again de-energized (and the first valve 13 also de-energized).

It will be seen that this system has relative simplicity in its basic function and construction, while, at the same time, not requiring double ducting into each graduate in order to purge the measuring space of air. Calibration fluid is not on both sides of the pistons, which simplifies the draining procedure; in fact to have calibration fluid below the piston would be an encumbrance because any air collecting in the lower part of the graduate will come to rest below the piston and will be difficult to purge.

The bottom ends 39 of the graduates 1 are slightly bell-mouthed so that should the graduates be overfilled, the pistons will pass through the bell-mouths and so break the seal allowing excess calibration fluid to go to waste through the exhaust port of the third solenoid valve 38. The bell-mouthing in the graduates ensures that the sealing edges of the pistons re-engage satisfactorily.

We claim:

1. Measuring apparatus for measuring the quantity of calibration fluid delivered by engine-fuel injection means, comprising:

(a) at least one vertically arranged hollow cylinder;

(b) a piston contained within said cylinder and able to slide within and along the interior thereof, and free to slide out of the bottom end of said cylinder to avoid excess pressure in the event of overfilling of said cylinder with calibration fluid;

(c) a bell-mouthed bottom end of said cylinder for easy re-engagement of said piston in the event that it does slide out of said bottom end;

(d) sealing means on said piston to seal the interior of said cylinder on one side of said piston from the interior of said cylinder on the other side of said piston;

(e) calibration-fluid receiving means connected to one end of said cylinder to enable calibration fluid to be conveyed to the interior of said cylinder on one side of said piston to displace the latter in one direction along said cylinder's interior;

(f) indicating means to indicate the position of said piston in relation to said cylinder, whereby the volume of calibration fluid which displaces said piston can be measured;

(g) draining means connected to said one end of said cylinder to enable calibration fluid to be drained from said cylinder's interior; and (h) pressurized gas pressure-transmitting means connected to the other end of said cylinder to enable the pressure of pressurized gas to be transmitted to the interior of said cylinder on the other side of said piston to displace the latter in the opposite direction along said cylinder's interior whereby calibration fluid is drained from said cylinder's interior through said draining means.

2. Apparatus according to claim 1, in which said cylinder is transparent and said indicating means comprise graduations on said cylinder.

3. Apparatus according to claim 1, in which said one end of said cylinder is the upper end thereof.

4. Apparatus according to claim 1, further comprising:
(a) aperture-defining means in said calibration-fluid receiving means:
(b) a diaphragm covering said aperture;
(c) a plunger on the opposite side of said diaphragm to said aperture; and
(d) a solenoid operated valve connected in said apparatus to selectively transmit the pressure of pressurized gas to said diaphragm via said plunger to urge said diaphragm against said aperture and so to seal the latter in a leak-proof manner.

5. Apparatus according to claim 1, further comprising:
(a) aperture-defining means in said calibration-fluid receiving means;
(b) a flexible diaphragm covering said aperture;
(c) a plunger on the opposite side of said diaphragm to said aperture; and
(d) pressurized-gas pressure-transmitting means connected in said apparatus to transmit the pressure of pressurized gas to said diaphragm via said plunger to urge said diaphragm against said aperture to create a back-pressure in incoming calibration fluid.

6. Apparatus according to claim 1, comprising:
(a) a multiplicity of hollow cylinders;
(b) a multiplicity of pistons respectively contained in said cylinders;

(c) aperture-defining means defining calibration-fluid apertures respectively associated with said hollow cylinders;
(d) a common valve adjacent said apertures operable to open or close said calibration-fluid apertures; and
(e) a further common valve connected to said cylinders to control supply of pressurized gas thereto.

7. Measuring apparatus for measuring the quantity of calibration fluid delivered by engine-fuel injection means, comprising:
(a) at least one hollow cylinder;
(b) a piston contained within said cylinder and able to slide within and along the interior thereof;
(c) sealing means on said piston to seal the interior of said cylinder on one side of said piston from the interior of said cylinder on the other side of said piston;
(d) calibration-fluid receiving means connected to one end of said cylinder to enable calibration fluid to be conveyed to the interior of said cylinder on one side of said piston to displace the latter in one direction along said cylinder's interior;
(e) indicating means to indicate the position of said piston in relation to the cylinder, whereby the volume of calibration fluid which displaces said piston can be measured;
(f) draining means connected to said one end of said cylinder to enable calibration fluid to be drained from said cylinder's interior;
(g) a source of pressurized gas connected to the other end of said cylinder to enable pressurized gas to flow into the interior of said cylinder on the other side of said piston to displace the latter in the opposite direction along said cylinder's interior, whereby calibration fluid is drained from said cylinder's interior through said draining means;
(h) cavity defining means;
(i) aperture-defining means of said calibration-fluid receiving means forming an outlet from said cavity;
(j) aperture-defining means of said draining means forming a further outlet from said cavity;
(k) respective plungers positioned adjacent to said apertures and moveable towards thereto and away therefrom; and
(l) a diaphragm extending between said plungers and said apertures for sealing the latter, one and the same said diaphragm being used to seal both apertures.

8. Measuring apparatus for measuring the quantity of calibration fluid delivered by engine-fuel injection means, comprising:
(a) at least one hollow cylinder;
(b) a piston contained within said cylinder and able to slide within and along the interior thereof;
(c) sealing means on said piston to seal the interior of said cylinder on one side of said piston from the interior of said cylinder on the other side of said piston;
(d) calibration-fluid receiving means connected to one end of said cylinder to enable calibration fluid to be conveyed to the interior of said cylinder on one side of said piston to displace the latter in one direction along said cylinder's interior;
(e) indicating means to indicate the position of said piston in relation to the cylinder, whereby the volume of calibration fluid which displaces said piston can be measured;

(f) draining means connected to said one end of said cylinder to enable calibration fluid to be drained from said cylinder's interior;

(g) a source of pressurized gas connected to the other end of said cylinder to enable pressurized gas to flow into the interior of said cylinder on the other side of said piston to displace the latter in the opposite direction along said cylinder's interior, whereby calibration fluid is drained from said cylinder's interior through said draining means;

(h) aperture-defining means of said calibration-fluid receiving means;

(i) aperture-defining means of said draining means;

(j) respective plungers positioned adjacent to said apertures and moveable towards thereto and away therefrom to selectively seal said apertures at respective first ends of said plungers;

(k) a diaphragm extending across the other ends of said plungers;

(l) pocket-defining means defining respective pockets in register with said plungers on the opposite side of said diaphragm to said plungers; and (m) fluid-pressure transmitting means connected to said pocket-defining means to enable the pressure of pressurized fluid to be selectively transmitted to said pockets thereby to selectively seal said apertures by means of said plungers.

9. Measuring apparatus according to claim 8, in which said other ends of said plungers are of increased cross-section, whereby a given pressure in each pocket will create a greater pressure at the said first ends of said plungers.

10. Measuring apparatus for measuring the quantity of calibration fluid delivered by engine-fluid injection means, comprising:

(a) at least one hollow cylinder;

(b) a piston contained within said cylinder and able to slide within and along the interior thereof;

(c) sealing means on said piston to seal the interior of said cylinder on one side of said piston from the interior of said cylinder on the other side of said piston;

(d) calibration-fluid receiving means connected to one end of said cylinder to enable calibration fluid to be conveyed to the interior of said cylinder on one side of said piston to displace the latter in one direction along said cylinder's interior;

(e) indicating means to indicate the position of said piston in relation to the cylinder, whereby the volume of calibration fluid which displaces said piston can be measured;

(f) draining means connected to said one end of said cylinder to enable calibration fluid to be drained from said cylinder's interior;

(g) a source of pressurized gas connected to the other end of said cylinder to enable pressurized gas to flow into the interior of said cylinder on the other side of said piston to displace the latter in the opposite direction along said cylinder's interior, whereby calibration fluid is drained from said cylinder's interior through said draining means;

(h) aperture-defining means in said calibration-fluid receiving means;

(i) a flexible diaphragm covering said aperture;

(j) a plunger on the opposite side of said diaphragm to said aperture; and (k) a pressurized-gas pressure-transmitting means connected in said apparatus to transmit the pressure of pressurized gas to said diaphragm via said plunger to urge said diaphragm against said aperture to create a back-pressure in incoming calibration fluid.

11. Measuring apparatus for measuring the quantity of calibration fluid delivered by engine-fuel injection means, comprising:

(a) at least one hollow cylinder;

(b) a piston contained within said cylinder and able to slide within and along the interior thereof;

(c) sealing means on said piston to seal the interior of said cylinder on one side of said piston from the interior of said cylinder on the other side of said piston;

(d) calibration-fluid receiving means connected to the upper end of said cylinder to enable calibration fluid to be conveyed to the interior of said cylinder on the upper side of said piston to displace the latter downwardly along said cylinder's interior;

(e) indicating means to indicate the position of said piston in relation to said cylinder, whereby the volume of calibration fluid which displaces said piston can be measured;

(f) draining means connected to said upper end of said cylinder to enable calibration fluid to be expelled from said cylinder's interior; and (g) a source of pressurized gas connected to the lower end of said cylinder to enable pressurized gas to flow into the interior of said cylinder on the lower side of said piston to displace the latter upwardly along said cylinder's interior, whereby calibration fluid is expelled from said cylinder's interior through said draining means.

* * * * *